United States Patent
Agapiou et al.

(10) Patent No.: US 10,883,034 B2
(45) Date of Patent: Jan. 5, 2021

(54) SETTABLE COMPOSITIONS COMPRISING CEMENT KILN DUST AND METHODS OF USE

(71) Applicant: Halliburton Energy Services, Inc., Houston, TX (US)

(72) Inventors: Kyriacos Agapiou, Houston, TX (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/443,673

(22) Filed: Jun. 17, 2019

(65) Prior Publication Data
US 2019/0300776 A1    Oct. 3, 2019

Related U.S. Application Data

(62) Division of application No. 15/038,375, filed as application No. PCT/US2013/074707 on Dec. 12, 2013, now Pat. No. 10,370,579.

(51) Int. Cl.
*C09K 8/487* (2006.01)
*C04B 28/18* (2006.01)
(Continued)

(52) U.S. Cl.
CPC ............ *C09K 8/487* (2013.01); *C04B 28/182* (2013.01); *C04B 28/26* (2013.01); *C09K 8/5045* (2013.01); *E21B 21/003* (2013.01); *E21B 33/138* (2013.01); *C04B 2103/46* (2013.01); *C09K 8/424* (2013.01); *C09K 8/501* (2013.01);
(Continued)

(58) Field of Classification Search
CPC .... C09K 8/487; C09K 8/5045; C04B 28/182; C04B 28/26; E21B 21/003; E21B 33/138
See application file for complete search history.

(56) References Cited

U.S. PATENT DOCUMENTS

| | | |
|---|---|---|
| 3,645,336 A | 2/1972 | Young et al. |
| 5,577,865 A | 11/1996 | Manrique et al. |

(Continued)

FOREIGN PATENT DOCUMENTS

| | | |
|---|---|---|
| RU | 2323186 | 4/2008 |
| WO | 2007063317 | 6/2007 |

(Continued)

OTHER PUBLICATIONS

European Examination Report for Application No. 13899093.2 dated Oct. 8, 2018.

(Continued)

*Primary Examiner* — Crystal J Miller
(74) *Attorney, Agent, or Firm* — Thomas Rooney; C. Tumey Law Group PLLC

(57) ABSTRACT

Embodiments relate to the use of alkali aluminates and alkali silicates with cement kiln dust to form a settable composition for use in subterranean operations. An embodiment provides a method comprising: introducing a settable composition comprising cement kiln dust, an alkali aluminate, an alkali silicate, and an aqueous carrier fluid into a subterranean formation; and allowing the settable composition to set and thereby reduce fluid flow through a portion of the subterranean formation.

5 Claims, 3 Drawing Sheets

(51) Int. Cl.
  *C04B 28/26* (2006.01)
  *C09K 8/504* (2006.01)
  *E21B 21/00* (2006.01)
  *E21B 33/138* (2006.01)
  *C09K 8/42* (2006.01)
  *C09K 8/50* (2006.01)
  *C09K 8/516* (2006.01)
  *C04B 103/46* (2006.01)
  *E21B 33/14* (2006.01)

(52) U.S. Cl.
  CPC .............. *C09K 8/516* (2013.01); *E21B 33/14* (2013.01); *Y02W 30/91* (2015.05)

(56) References Cited

U.S. PATENT DOCUMENTS

| | | |
|---|---|---|
| 6,767,398 B2 | 7/2004 | Trato |
| 6,832,652 B1 | 12/2004 | Dilinbeck et al. |
| 7,077,203 B1 | 7/2006 | Roddy et al. |
| 7,174,962 B1 | 2/2007 | Roddy et al. |
| 7,199,086 B1 * | 4/2007 | Roddy .................... C04B 28/02 106/707 |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,226,895 B2 | 6/2007 | Xiang |
| 7,284,609 B2 | 10/2007 | Roddy et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,353,870 B2 | 4/2008 | Roddy et al. |
| 7,381,263 B2 | 7/2008 | Roddy et al. |
| 7,387,675 B2 | 7/2008 | Roddy et al. |
| 7,395,860 B2 | 7/2008 | Roddy et al. |
| 7,445,669 B2 | 11/2008 | Roddy et al. |
| 7,478,675 B2 | 1/2009 | Roddy et al. |
| 7,607,482 B2 | 10/2009 | Roddy et al. |
| 7,674,332 B2 | 3/2010 | Roddy et al. |
| 7,743,828 B2 | 6/2010 | Roddy et al. |
| 7,789,150 B2 | 9/2010 | Roddy et al. |
| 7,927,419 B2 | 4/2011 | Roddy et al. |
| 8,047,282 B2 | 11/2011 | Lewis et al. |
| 8,261,827 B2 | 9/2012 | Roddy et al. |
| 8,281,859 B2 | 10/2012 | Roddy et al. |
| 8,297,357 B2 | 10/2012 | Brenneis et al. |
| 8,307,899 B2 | 11/2012 | Brenneis et al. |
| 8,318,642 B2 | 11/2012 | Roddy et al. |
| 8,324,137 B2 | 12/2012 | Roddy et al. |
| 8,327,939 B2 | 12/2012 | Roddy et al. |
| 8,383,558 B2 | 2/2013 | Reddy et al. |
| 8,399,387 B2 | 3/2013 | Roddy et al. |
| 8,486,869 B2 | 7/2013 | Brenneis et al. |
| 8,505,629 B2 | 8/2013 | Benkley et al. |
| 8,522,873 B2 | 9/2013 | Benkley et al. |
| 8,551,923 B1 | 10/2013 | Benkley et al. |
| 8,609,595 B2 | 12/2013 | Morgan et al. |
| 8,627,888 B2 | 1/2014 | Santra et al. |
| 8,895,485 B2 | 11/2014 | Roddy et al. |
| 8,895,486 B2 | 11/2014 | Roddy et al. |
| 8,921,284 B2 | 12/2014 | Benkley et al. |
| 8,950,486 B2 | 2/2015 | Benkley et al. |
| 9,006,154 B2 | 4/2015 | Morgan et al. |
| 9,006,155 B2 | 4/2015 | Roddy et al. |
| 9,023,150 B2 | 5/2015 | Brenneis et al. |
| 9,051,505 B2 | 6/2015 | Roddy et al. |
| 9,150,773 B2 | 10/2015 | Chatterji et al. |
| 9,157,020 B2 | 10/2015 | Chatterji et al. |
| 2004/0256102 A1 | 12/2004 | Trato |
| 2007/0056474 A1 | 3/2007 | Roddy et al. |
| 2008/0156491 A1 | 7/2008 | Roddy et al. |
| 2009/0137431 A1 | 5/2009 | Reddy et al. |
| 2010/0051275 A1 | 3/2010 | Lewis et al. |
| 2012/0285682 A1 | 11/2012 | Santa et al. |
| 2012/0298357 A1 * | 11/2012 | Ezell .................... C09K 8/5045 166/279 |
| 2013/0008351 A1 | 1/2013 | Roddy et al. |
| 2013/0312641 A1 | 11/2013 | Adams et al. |
| 2014/0364535 A1 * | 12/2014 | Chatterji ................ C04B 28/02 523/130 |

FOREIGN PATENT DOCUMENTS

| | | | |
|---|---|---|---|
| WO | WO-2008017414 A1 * | 2/2008 | .......... C04B 28/006 |
| WO | 2011041540 | 4/2011 | |

OTHER PUBLICATIONS

European Patent Office Search Report for Application No. 13899093.2 dated Feb. 12, 2018.
European Search Report for Application No. 13899093.2 dated May 15, 2017.
Russian Examination Report for Russian Application No. 2016116782 dated Feb. 14, 2017.
Australian Examination Report No. 1 for Australian Application No. 2013407284 dated Sep. 13, 2016.
International Search Report and Written Opinion for International Application No. PCT/US2013/074707 dated Sep. 15, 2014.
Office Action for Application No. 15038375 dated Sep. 26, 2019.

* cited by examiner

SETTABLE COMPOSITIONS COMPRISING CEMENT KILN DUST AND METHODS OF USE

BACKGROUND

Embodiments relate to settable compositions and, more particularly, embodiments relates to the use of alkali aluminates and alkali silicates with cement kiln dust to form a settable composition for use in subterranean operations.

A natural resource such as oil or gas residing in a subterranean formation can be recovered by drilling a wellbore into the formation. A wellbore is typically drilled while circulating a drilling fluid through the wellbore. Among other things, the circulating drilling fluid may lubricate the drill bit, carry drill cuttings to the surface, and balance the formation pressure exerted on the wellbore. One problem associated with drilling may be the undesirable loss of drilling fluid to the formation. Such lost fluids typically may go into, for example, pre-existing fractures, induced fractures, cracks, vugs, channels, or other openings through which fluid may be lost. This problem may be referred to as "lost circulation," and the sections of the formation into which the drilling fluid (or other fluid) may be lost may be referred to as "lost circulation zones." The loss of drilling fluid into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a wellbore.

A number of techniques have been developed for combating lost circulation one of which involves the placement of lost circulation materials into the lost circulation zone. Conventional lost circulation materials may include fibrous, lamellated or granular materials. The lost circulation materials may be placed into the formation, inter alia, as part of a drilling fluid or as a separate lost circulation pill in an attempt to control and/or prevent lost circulation. Another technique that has been developed to control lost circulation involves the placement of a settable composition into the wellbore to seal the lost circulation zone. For a number of reasons, however, these techniques may not provide a desirable level of lost circulation control in all circumstances.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
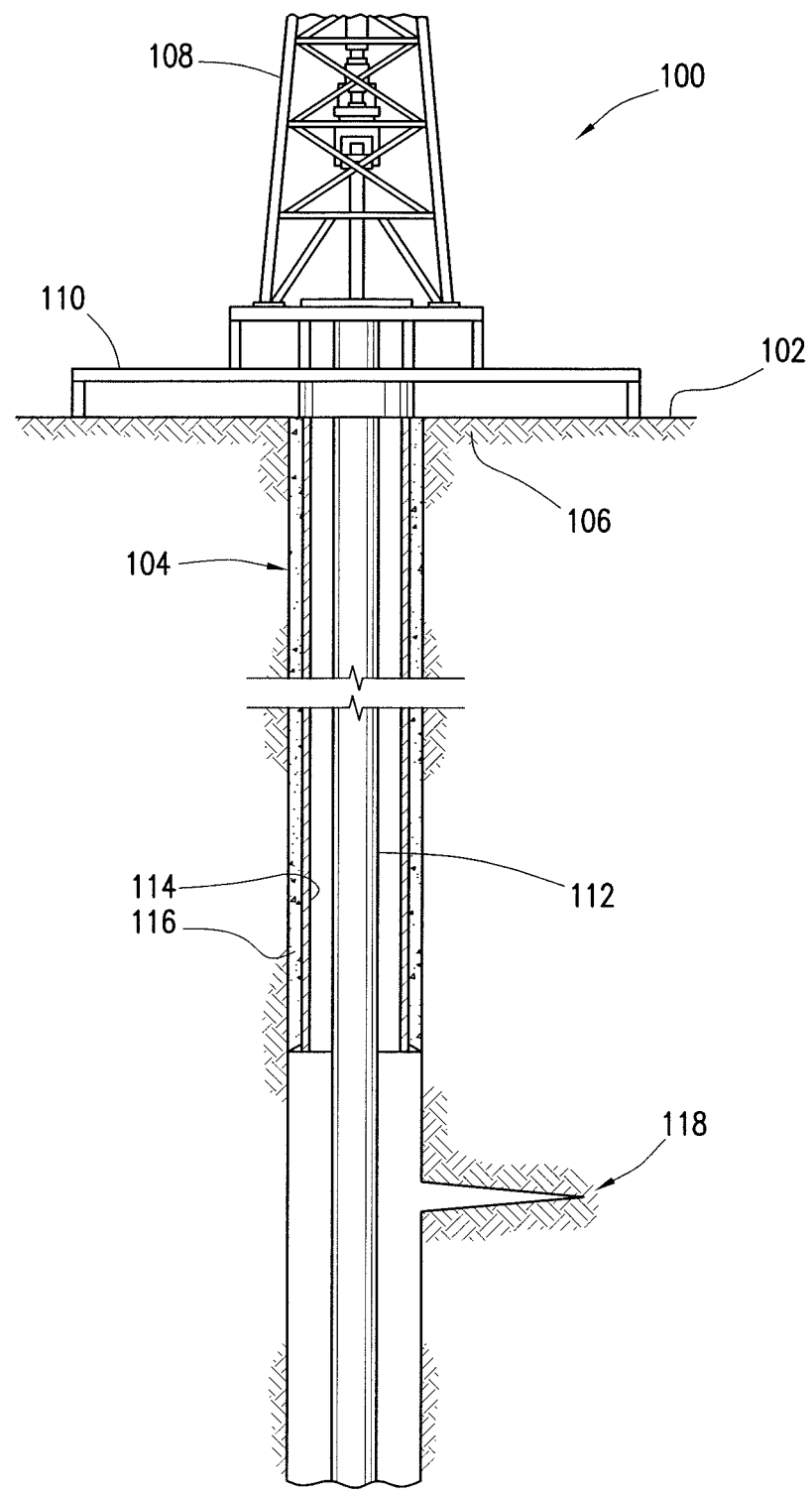
FIG. 1 illustrates an embodiment of a wellbore penetrating a subterranean formation with a lost circulation zone extending into the subterranean formation.

Embodiments relate to settable compositions and, in certain embodiments, to use of alkali aluminates and alkali silicates with cement kiln dust to form a settable composition for use in subterranean operations. There may be several potential advantages to the present methods and compositions, only some of which may be alluded to herein. One of the many potential advantages of the present methods and compositions is that the settable composition may rapidly form a non-flowable gel, which can be used to bridge off and plug the lost circulation zones, which may include fractures (natural or pre-existing), cracks, vugs, channels, and/or other openings through which fluid may be lost. Because a minor portion of the settable composition may remain an active free fluid in a flowable liquid state even after formation of the non-flowable gel, the active free fluid may penetrate further into the formation and act to provide improved sealing capacity for the settable composition. Another potential advantage of the methods and compositions may be that, by including the cement kiln dust, the settable composition sets into a hardened mass with reasonable compressive strength to more effectively prevent loss of fluid circulation.

An embodiment of the settable compositions may comprise cement kiln dust, an alkali aluminate, an alkali silicate, and an aqueous carrier fluid. Embodiments of the settable compositions may further comprise one or more additional additives, such as a bridging material. Those of ordinary skill in the art will appreciate that embodiments of the settable compositions generally should have a density suitable for a particular application. By way of example, the settable compositions may have a density in the range of from about 5 pounds per gallon ("lb/gal") to about 25 ppg. In certain embodiments, the settable compositions may have a density in the range of from about 8 lb/gal to about 12 lb/gal and, alternatively, about 9 lb/gal to about 11 lb/gal. Embodiments of the lost circulation compositions may be foamed or unfoamed or may comprise other means to reduce their densities, such as hollow microspheres, low-density elastic beads, or other density-reducing additives known in the art. Weighting agents may also be used to increase the density of the settable compositions, in some embodiments. Those of ordinary skill in the art, with the benefit of this disclosure, will recognize the appropriate density for a particular application.

The settable compositions may comprise cement kiln dust. Cement kiln dust, as that term is used herein, refers to a solid material generated as a by-product of the heating of certain materials in kilns during cement production. The term "cement kiln dust" as used herein is intended to include cement kiln dust made as described herein and equivalent forms of cement kiln dust. Depending on its source, for example, the cement kiln dust may exhibit cementitious properties in that it can set and harden in the presence of water. Cement kiln dust may be generated as a by-product of cement production that is removed from the gas stream and collected, for example, in a dust collector. Usually, large quantities of cement kiln dust are collected in the production of cement that are commonly disposed of as waste. Disposal of the cement kiln dust can add undesirable costs to the manufacture of the cement, as well as the environmental concerns associated with its disposal. The chemical analysis of the cement kiln dust from various cement manufactures varies depending on a number of factors, including the particular kiln feed, the efficiencies of the cement production operation, and the associated dust collection systems. Cement kin dust generally may comprise a variety of oxides, such as $SiO_2$, $Al_2O_3$, $Fe_2O_3$, $CaO$, $MgO$, $SO_3$, $Na_2O$, and $K_2O$.

In some embodiments, the cement kiln dust may be included in the settable composition as a cementitious component that can set and harden by reaction with water. In addition, the cement kiln dust may also function as a bridging material that can bridge across fractures, cracks, vugs, channels, or other openings in the lost circulation zone. The cement kiln dust may also reinforce the non-flowable gel formed by the settable composition. The cement kiln dust may be present in the settable composition in an amount in the range of from about 1% to about 30% by weight of the settable composition and, alternatively, from about 5% to about 25% by weight of the settable composition. For example, the cement kiln dust may be included in an amount of about 1%, about 5%, about 10%, about 15%, about 20%, or about 25% by weight of the settable composition. In some embodiments, the settable composition may be free or essentially free (<0.5% by weight) of any additional cementitious components other than the cement kiln dust. One of ordinary skill in the art, with the benefit of this disclosure, should recognize the appropriate amount of cement kiln dust to include for a chosen application.

The settable compositions may further comprise an alkali aluminate. The alkali aluminate may comprise any alkali metal, including, but not limited to, lithium, sodium, potassium, rubidium, cesium, and francium. In a particular embodiment, the alkali aluminate comprises sodium aluminate. In some embodiments, the alkali aluminate may be provided as an aqueous alkali aluminate in which the alkali aluminate has been dissolved in water. An example of a suitable aqueous alkali aluminate is VersaSet L thixotropic additive, available from Halliburton Energy Services, Inc. The alkali aluminate may be present in the settable composition in an amount in the range of from about 1% to about 40% by weight of the settable composition and, alternatively, from about 5% to about 30% by weight of the settable composition. For example, the alkali aluminate may be included in an amount of about 1%, about 5%, about 10%, about 15%, about 20%, about 25%, about 30%, about 35%, or about 40% by weight of the settable composition. One of ordinary skill in the art, with the benefit of this disclosure, should recognize the appropriate amount of the alkali aluminate to include for a chosen application.

The settable compositions may further comprise an alkali silicate. The alkali silicate may interact with the alkali aluminate to form a gel. The gel may be a non-flowable gel that comprises a three-dimensional network based on interaction between the alkali silicate and alkali aluminate. The formation of the gel may be acid or base catalyzed. The reaction may be quicker where base catalyzed with a slower reaction if acid catalyzed. The alkali silicate may comprise any alkali metal, including, but not limited to, lithium, sodium, potassium, rubidium, cesium, and francium. In a particular embodiment, the alkali silicate comprises sodium silicate. In some embodiments, the alkali silicate may be provided as an aqueous alkali silicate in which the alkali silicate has been dissolved in water. An example of a suitable aqueous alkali silicate is Liquid Econolite™ additive, available from Halliburton Energy Services. The aqueous alkali silicate may be formed by adding colloidal silica to sodium hydroxide. The ratios of the colloidal silica to sodium hydroxide may be adjusted to change pH and silica dissolution, among others. The alkali silicate may be present in the settable composition in an amount in the range of from about 1% to about 40% by weight of the settable composition and, alternatively, from about 5% to about 30% by weight of the settable composition. For example, the alkali silicate may be included in an amount of about 1%, about 5%, about 10%, about 15%, about 20%, about 25%, about 30%, about 35%, or about 40% by weight of the settable composition. One of ordinary skill in the art, with the benefit of this disclosure, should recognize the appropriate amount of the alkali silicate to include for a chosen application.

The settable composition may further comprise an aqueous carrier fluid. The aqueous carrier fluid may comprise any of a variety of different aqueous fluids, including, but not limited to, tap water, fresh water, de-ionized water, salt water, and combinations thereof. Generally, the aqueous carrier fluid may be from any source, provided that the aqueous carrier fluid does not contain an excess of compounds that may undesirably affect other components in the treatment fluid. The aqueous carrier fluid may be included in an amount in a range of from about 10% to about 80% by weight of the settable composition and, alternatively, from about 30% to about 60% by weight of the settable composition A wide variety of additional additives may be included in the settable compositions as deemed appropriate by one skilled in the art, with the benefit of this disclosure. Examples of such additives include, but are not limited to: weighting agents, lightweight additives (e.g., microspheres) viscosifying agents (e.g., clays, hydratable polymers, guar gum), free water control additives, fluid loss control additives, bridging agents, dispersants, foaming additives (e.g., foaming surfactants), defoamers, corrosion inhibitors, scale inhibitors, formation conditioning agents, and water-wetting surfactant. Specific examples of these, and other, additives include: organic polymers, biopolymers, latex, ground rubber, surfactants, crystalline silica, amorphous silica, silica flour, fumed silica, nano-clays (e.g., clays having at least one dimension less than 100 nm), salts, fibers, hydratable clays, microspheres, rice husk ash, micro-fine cement (e.g., cement having an average particle size of from about 5 microns to about 10 microns), metakaolin, zeolite, shale, Portland cement, Portland cement interground with pumice, perlite, barite, slag, lime (e.g., hydrated lime), gypsum, and any combinations thereof, and the like. A person having ordinary skill in the art, with the benefit of this disclosure, will readily be able to determine the type and amount of additive useful for a particular application and desired result. It should be understood that, while the present disclosure describes a number of optional additives that may be included in the settable compositions, it is intended to cover all combinations of the disclosed additives.

The settable compositions may be used in a variety of different applications where it may be desired to form a seal in a subterranean formation, including plugging, abandoning, lost circulation, and fluid control, among others. In some embodiments, a settable composition may be introduced into a wellbore; and allowed to form a non-flowable gel. The settable composition may form the non-flowable gel in a lost circulation zone or other location through which the flow of fluids may be desirably reduced or prevented. The settable composition may comprise cement kiln dust, an alkali aluminate, an alkali silicate, and an aqueous carrier fluid. The settable composition may further comprise one or more optional additives as described herein.

An embodiment may provide a settable composition comprising: cement kiln dust, an alkali aluminate, an alkali silicate, and an aqueous carrier fluid.

Another embodiment may provide a system comprising: a settable composition comprising cement kiln dust, an alkali aluminate, an alkali silicate, and an aqueous carrier fluid; and pumping equipment for introducing the settable composition into a subterranean formation.

Another embodiment may provide a method comprising cement kiln dust, an alkali aluminate, an alkali silicate, and an aqueous carrier fluid into a subterranean formation; and allowing the settable composition to set and thereby reduce fluid flow through a portion of the subterranean formation.

Another embodiment may provide a method comprising: introducing a first stream comprising an aqueous alkali aluminate and cement kiln dust into a lost circulation zone in a subterranean formation; introducing a second stream comprising an aqueous alkali silicate into the lost circulation zone in the subterranean formation; forming a settable composition upon intermixing of the first stream and the second stream; and allowing the settable composition to set in the lost circulation zone.

In some embodiments, the settable composition may set to form an aluminosilicate gel. In particular embodiments, the settable composition may form a non-flowable gel. By inclusion of the cement kiln dust in the settable composition, the settable composition may set into a hardened mass with reasonable compressive strength. Furthermore, in embodiments, a minor portion of the settable composition may remain an active free fluid in a flowable liquid state even after gel formation. In some embodiments, the settable composition may be prepared by mixing the cement kiln dust into an aqueous alkali aluminate to make a slurry and then introducing an aqueous alkali silicate to the slurry to form the settable composition. In a particular embodiment, the ratio of aqueous alkali aluminate to cement kiln dust to aqueous alkali silicate in the settable composition may be about 2:1:2. However, by adjusting the concentration of composition components, the performance and behavior of the settable composition may be attenuated. By way of example, the volume of gel and hardened material may increase with decreasing ratio of alkyl aluminate to alkyl silicate. The volume of the active free fluid may also decrease with decreasing ratio of alkyl aluminate to alkyl silicate.

In embodiments, the settable composition may be characterized by exhibiting an unconfined uniaxial compressive strength of about 50 psi or more. These values may be achieved in 7 days or less. Some formulations may be designed so as to provide these compressive strengths with 24 hours to 48 hours. Typical sample geometry and sizes for measurement are similar to, but not limited to, those used for characterizing oil well cements: 2 inch cubes; or 2 inch diameter cylinders that are 4 inches in length; or 1 inch diameter cylinders that are 2 inches in length; and other methods known to those skilled in the art of measuring "mechanical properties" of oil well cements. For example, the compressive strength may be determined by crushing the samples in a compression-testing machine. The compressive strength is calculated from the failure load divided by the cross-sectional area resisting the load and is reported in units of pound-force per square inch (psi). Compressive strengths may be determined in accordance with API RP 10B-2, Recommended Practice for Testing Well Cements, First Edition, July 2005.

In embodiments, a minor portion of the settable composition may remain an active free fluid in a flowable liquid state even after non-flowable gel formation. For example, the active free fluid may be present in the settable composition in an amount of about 40% or less by volume of the settable composition, alternatively about 20% or less by volume; alternatively about 10% or less by volume; and alternatively about 5% of less by volume.

As noted above, in an embodiment, the settable compositions may be introduced into the wellbore to provide lost circulation control. For example, the settable composition may be used to prevent the loss of fluids (e.g., drilling fluids) into lost circulation zones, which may contain fractures (natural or pre-existing), cracks, vugs, channels and other openings into which fluid may be lost. In particular embodiments, the settable composition may be introduced into the wellbore as a single stream to form a barrier that substantially seals a lost circulation zone or other undesirable flowpath. For example, the settable composition may be placed downhole through the drill bit. In another embodiment, the settable composition may be formed downhole by mixing a first stream comprising one or more composition components and a second stream comprising additional composition components. For example, the settable composition may be formed downhole by the mixing of a first aqueous stream comprising an alkali aluminate and a second aqueous stream comprising an alkali silicate. The cement kiln dust may be included in the first aqueous stream, the second aqueous stream, or both the first and second aqueous streams.

In an embodiment, the settable composition may be introduced into the wellbore, the subterranean formation, or a lost circulation zone as a single aqueous stream. That is, in such an embodiment, all components of the settable composition may be mixed and introduced into the wellbore as a single composition. As will be understood by those of skill in the art with the aid of this disclosure, introduction as a single aqueous stream may be an appropriate mode of introduction where the setting of a gel can be delayed, retarded, or otherwise controlled such that the gel will not set until reaching a desired location. For example, one or more of the reactive components (e.g., alkali aluminate, alkali silicate) may be encapsulated when introduced into the wellbore to retard the gelation. The encapsulated component may be released so as to contact the other components of the settable composition in a downhole portion of the wellbore near, proximate to, or within the lost circulation zone. When the components of the settable composition are allowed to contact, the settable composition may gel or begin to gel. Thus, by contacting the composition components within (or near) the lost circulation zone, the gel may form within the lost circulation zone. By way of further example, one or more of the reactive components (e.g., alkali aluminate, alkali silicate) may be provided in a solid form so that reaction is delayed until dissolution of the solid material in the aqueous carrier fluid.

In an alternative embodiment, the settable composition may be introduced into the wellbore, the formation, or the lost circulation zone in multiple components. As will be understood by those of ordinary skill in the art, it may be desirable or advantageous to introduce components of the settable composition separately, for example, in situations where the settable composition will gel within a relatively short time-frame (e.g., those gels which may set or begin to set within an amount of time less than is necessary to introduce the settable composition into the desired location). Introducing two or more of the components of the settable composition separately allows the settable composition to be positioned within the lost circulation zone prior to gelation. The separate introduction of at least two of the composition components may be achieved by various means, described in greater detail herein below.

In some embodiments, the separate introduction of at least two of the composition components may be achieved by introduction via two or more independent fluid streams. That is, a first component may be introduced into the wellbore, formation, or lost circulation zone via a first flowpath and a second component may be introduced via a second flowpath which is separate from the first flowpath. The introduction of fluids into a wellbore via two or more flowpaths is known to those of skill in the art, for example, via flow inside a tubular and an annular spaced defined by the tubular and the wellbore (or a larger tubular). Introduction into the wellbore via two or more flowpaths may provide several advantages to the operator. For example, the first component of the settable composition may be included within a drilling fluid which is circulated through the wellbore during drilling operations. If a lost circulation zone is encountered during drilling operations, a second component may be introduced into the wellbore via a flowpath separate from the flowpath by which the drilling fluid is circulated. Utilizing a gelable composition which sets instantaneously or substantially instantaneously causes gelation to occur where, or substantially near where, the first component and the second component come into contact. Thus, utilizing multiple flowpaths may allow the operator to plug or seal a lost circulation zone without entirely ceasing drilling operations.

In another embodiment, the separate introduction of at least two of the composition components may be achieved by introducing the components within a single flowpath, but being separated by a spacer fluid. Such a spacer fluid may comprise a highly viscous fluid which substantially or entirely prevents the intermingling of the composition components while being pumped into a wellbore. Example spacer fluids and methods of using the same are generally known to those of ordinary skill in the art. Once introduced to the subterranean formation the settable composition may enter the lost circulation zone and set to form a mass that substantially inhibits or eliminates lost circulation.

In an embodiment, the method of combating lost circulation may comprise introducing the settable composition into a lost circulation zone or other undesirable flowpath. The settable composition may be an effective means of combating lost circulation in a lost circulation zone or other flowpath. The settable composition may be introduced as a single stream or multiple streams as described previously herein. Not seeking to be bound by any particular theory, the components of the settable composition may work synergistically to combat lost circulation. For example, as the settable composition is introduced into the lost circulation zone or flowpath, the cement kiln dust may bridge some portion of the cavities in the lost circulation zone or other flowpath. Once introduced, at least a portion of the settable composition may rapidly form a gel. In particular embodiments, the settable composition may form a ringing gel. Over time, the gel may set into a hardened mass with reasonable compressive strength. A minor portion of the settable composition may remain an active free fluid in a flowable liquid state even after gel formation. This active free fluid may permeate further into the lost circulation zone where it may then harden to more effectively control lost circulation.

Turning now to FIG. 1, an example operating environment for the methods and compositions described herein is shown. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure. As illustrated, a drilling rig 100 may be positioned on the Earth's surface 102 and extends over and around a wellbore 104 that penetrates a subterranean formation 106. While the wellbore 104 is shown extending generally vertically into the subterranean formation 106, the principles described herein are also applicable to wellbores that extend at an angle through the subterranean formation 106, such as horizontal and slanted wellbores. The wellbore 104 may be drilled into the subterranean formation 106 using any suitable drilling technique. In an embodiment, the drilling rig 100 comprises a derrick 108 with a rig floor 110 through which a work string 112 extends downward from the drilling rig 100 into the wellbore 104. While not shown, the work string 112 may a deliver a wellbore servicing apparatus (e.g., a drill bit) or some part thereof to a predetermined depth within the wellbore 104. In some embodiments, at least a portion of the wellbore 104 may be lined with a casing 114 that may be secured into position in the wellbore 104 using cement 116. In alternative embodiments, the wellbore 104 may be partially cased and cemented thereby resulting in a portion of the wellbore 104 being openhole.

During any one or more wellbore drilling, completion, or servicing operations, a lost circulation zone 118 may be encountered. Where the lost circulation zone 118 is encountered, it may be desirable to employ a settable composition disclosed herein to prevent, lessen, minimize, and/or cease the loss of fluids to the lost circulation zone 118. Placement of the settable composition into the lost circulation zone 118 may be an effective means of plugging or sealing off the lost circulation zone 118 and thereby preventing, ceasing, and/or substantially lessening the loss of fluids from the wellbore 104 to the lost circulation zone 118. As previously described, in embodiments, the settable composition may be placed into the lost circulation zone 118 as a single stream or as two or more streams. While the lost circulation zone 118 is shown as an opening that extends from the wellbore 104 into the subterranean formation 106, it is contemplated that the lost circulation zone 118 may contain one or more features including without limitation fractures (natural or pre-existing), cracks, vugs, channels, openings, and/or the like. Moreover, while the lost circulation zone 118 is illustrated in an openhole section of the wellbore 104, it is contemplated that a lost circulation zone may also occur in a section of the wellbore 104 with the casing 114.

Figure 2:
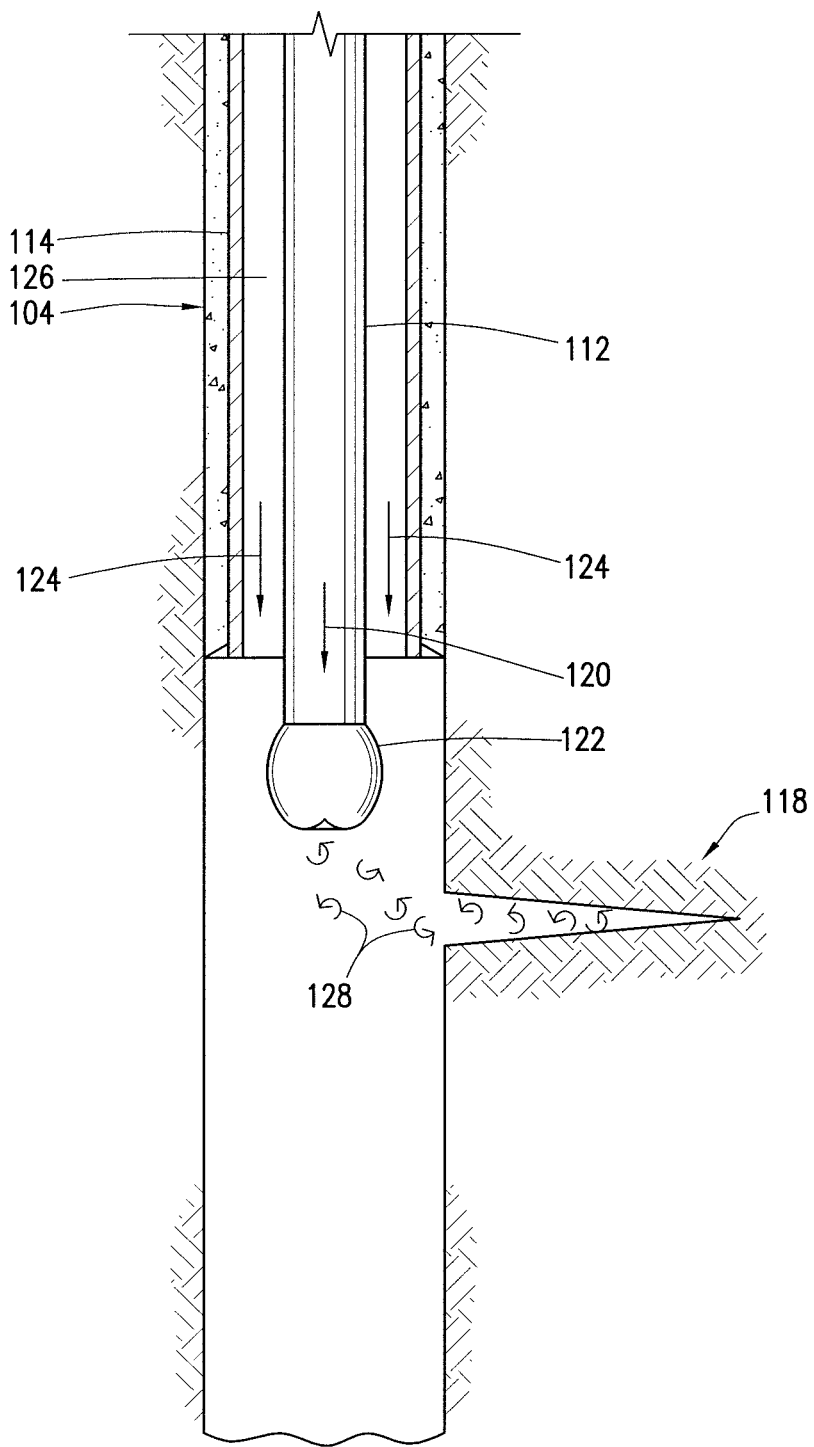
FIG. 2 illustrates an embodiment of introduction of a settable composition into the lost circulation zone of FIG. 1.

Turning now to FIG. 2, the settable composition, which may comprise cement kiln dust, an alkali aluminate, an alkali silicate, and an aqueous carrier fluid, may be placed into the lost circulation zone 118 in accordance with example embodiments. A first stream 120 may be pumped down through the interior of the work string 112 through the drill bit 122 on the work string 112 and into the lost circulation zone 120. The first stream 120 may comprise one or more components of the settable composition. For example, the first stream 120 may comprise the alkali aluminate or the alkali silicate. Optionally, the first stream 120 may further comprise the cement kiln dust. A second stream 124 may be pumped down through an annulus 124 between the work string 112 and the casing 114 and into the lost circulation zone 118. The second stream 124 may comprise one or more components of the settable composition. For example, the second stream 124 may comprise the alkali aluminate or the alkali silicate. Optionally, the first stream 124 may further comprise the cement kiln dust. Additional components of the settable composition may also be included in the first and second streams 120, 124 as desired by one of ordinary skill in the art. As illustrated by arrows 128, the first and second streams 120, 124 may contact and intermix to form the settable composition in the lost circulation zone 118. The contact and intermixing of the first and second streams 120, 124 may occur in a downhole portion of the wellbore 114 near, proximate to, or within the lost circulation zone 118. At least a portion of the settable composition may set in the lost circulation zone 118 to form a hardened mass thereby preventing, ceasing, and/or substantially lessening the loss of fluids from the wellbore 104 to the lost circulation zone 118. As previously described, in embodiments, a minor portion of the settable composition may remain in an active fluid state even after gel formation allowing greater penetration of the settable composition into the lost circulation zone 118.

Figure 3:
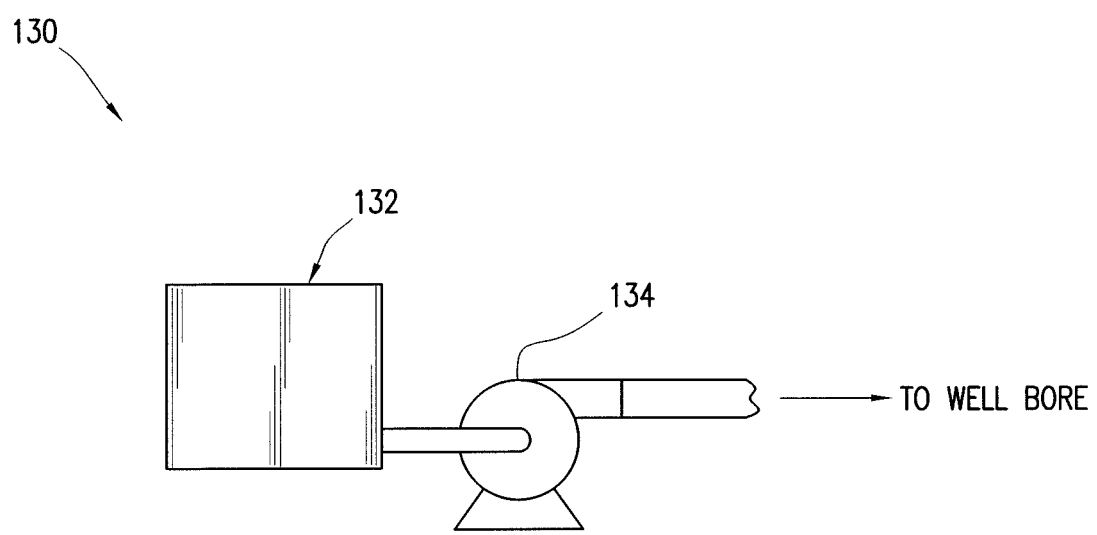
FIG. 3 illustrates a system for the preparation and delivery of a settable composition into a wellbore in accordance with certain embodiments.

Turning now to FIG. 3, a system 130 is illustrated that may be used in placement of a settable composition or particular portion thereof into a wellbore 118 in accordance with certain embodiments. As shown, the settable composition (or a portion thereof) may be mixed in mixing equipment 132, such as a jet mixer, re-circulating mixer, or a batch mixer, for example, and then pumped via pumping equipment 134 to the wellbore 118. In some embodiments, the mixing equipment 132 and the pumping equipment 134 may be disposed on one or more cement trucks as will be apparent to those of ordinary skill in the art. While not shown separately, in embodiments, the mixing equipment 132 may comprise one or more of a circulating pump, a liquid additive system, an additive tank, and/or a storage tank. While also not shown separately, the pumping equipment 134 may comprise one or more pumps configured to separately introduce the settable composition to the wellbore 118 in two or more different streams.

The exemplary settable compositions disclosed herein may directly or indirectly affect one or more components or pieces of equipment associated with the preparation, delivery, recapture, recycling, reuse, and/or disposal of the disclosed settable compositions. For example, the settable compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary settable compositions. The disclosed settable compositions may also directly or indirectly affect any transport or delivery equipment used to convey the settable compositions (or components thereof) to a well site or downhole such as, for example, any transport vessels, conduits, pipelines, trucks, tubulars, and/or pipes used to compositionally move the settable compositions from one location to another, any pumps, compressors, or motors (e.g., topside or downhole) used to drive the settable compositions into motion, any valves or related joints used to regulate the pressure or flow rate of the settable compositions, and any sensors (i.e., pressure and temperature), gauges, and/or combinations thereof, and the like. The disclosed settable compositions may also directly or indirectly affect the various downhole equipment and tools that may come into contact with the settable compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLES

The following example was performed to demonstrate gelation and hardening of settable compositions comprising cement kiln dust, an aqueous sodium aluminate, and an aqueous sodium silicate. Thirteen different samples (designated Samples 1-13) were prepared using the indicated amounts of cement kiln dust, aqueous sodium aluminate, and aqueous sodium silicate. An aqueous carrier fluid is not separately listed as the aqueous sodium aluminate and aqueous sodium silicate were aqueous solutions of 38% sodium aluminate by weight and 40% sodium silicate by weight, respectively. Samples 3, 6, and 9 are comparative samples because no cement kiln dust was included. Sample 12 is a comparative sample as it did not contain the sodium silicate. Sample 13 is a comparative sample as it did not contain the sodium aluminate. The cement kiln dust used in this example was obtained from Holcim, Inc. The aqueous sodium aluminate used in this example was VersaSet L thixotropic additive, available from Halliburton Energy Services, Inc. The aqueous sodium silicate used in this example was Liquid Econolite™ additive, available from Halliburton Energy Services.

The samples were mixed by first preparing the aqueous sodium aluminate-cement kiln dust slurry, followed by addition of the aqueous sodium silicate solution to the slurry with stirring. For example, to 50 grams of aqueous sodium aluminate (38% by weight) was added 25 grams of cement kiln dust. The mixture was manually stirred with a spatula to form a slurry. After, 50 grams of aqueous sodium silicate solution (40% by weight) was added to the slurry, and the mixture stirred manually with a spatula to form a non-flowable gelatinous material. After preparation, the samples were left undisturbed in their containers to set into a hardened mass. The compositions were analyzed for gelation and solidification by visual observation. The amount of active free fluid was determined by decanting the fluid from the bulk gelatinous product into a graduated cylinder.

The results of this Example are summarized in the table below.

TABLE 1

| Sample | Aqueous Sodium Aluminate (g) | Aqueous Sodium Silicate (g) | Cement Kiln Dust (g) | Volume of Active Free Fluid (mL) | Observations |
|---|---|---|---|---|---|
| 1 | 50 | 25 | 5 | 35 | Non-flowable gel formed immediately; never fully solidified |
| 2 | 50 | 25 | 10 | 0 | Flowable gel formed immediately; gel remained in a flowable state after 24 hours |
| 3 | 50 | 25 | 0 | 32 | Non-flowable gel formed immediately; never fully solidified |
| 4 | 50 | 50 | 5 | 25 | Non-flowable gel formed immediately; complete solidification in less than 30 minutes |
| 5 | 50 | 50 | 10 | 30 | Non-flowable gel formed immediately; complete solidification in less than 20 minutes |
| 6 | 50 | 50 | 0 | 24 | Non-flowable gel formed immediately; no solidification; free fluid remained after 48 hours |
| 7 | 25 | 50 | 5 | 4.5 | Non-flowable gel formed immediately; complete solidification in less than 30 minutes |
| 8 | 25 | 50 | 10 | 2.5 | Non-flowable gel formed immediately; complete solidification in less than 20 minutes |
| 9 | 25 | 50 | 0 | 0 | Non-flowable gel formed immediately; no solidification |
| 10 | 50 | 50 | 25 | 24 | Non-flowable gel formed immediately; complete solidification in less than 20 minutes |
| 11 | 25 | 50 | 25 | 0 | Non-flowable gel formed immediately; complete solidification in less than 30 minutes |
| 12 | 50 | 0 | 5 | n/a | Formed viscous slurry that was flowable; Non-flowable gel did not form for at least 48 hours |
| 13 | 0 | 50 | 5 | n/a | Formed viscous slurry that was flowable; non-flowable gel did not form for at least 48 hours |

Samples 1-3: It was found that the gel formed immediately. However, the resulting compositions never fully solidified.

Samples 4-6: It was found that, when a mixture of aqueous sodium aluminate, cement kin dust and aqueous sodium silicate where mixed in a 10:1:10 ratio (Sample 4), a non-flowable gel formed immediately with the retention of an active free fluid surrounding the non-flowable gel. This active free fluid within less than 30 minutes of mixing also solidified and the entire mixture became a hardened mass. Increasing the amount of cement kiln dust in Sample 5 such that the ratio of aqueous sodium aluminate, cement kin dust and aqueous sodium silicate was 5:1:5, resulting in similar immediate non-flowable gel formation and amount of free fluid retained; however, the setting time was reduced by ⅓ (from 30 minutes for Sample 4 to 20 minutes for Sample 5). For the control (Sample 6), a mixture of equal parts aqueous sodium aluminate and aqueous sodium silicate with no cement kiln dust formed a non-flowable gel immediately upon mixing; however, the mixture did not set into a hardened mass. Rather, it remained a non-flowable gel surrounded by the active free fluid.

Samples 7-9: Reducing the amount of aqueous sodium aluminate such that the ratio of aqueous sodium aluminate, cement kin dust and aqueous sodium silicate was 5:1:10 (Sample 7), resulted in compositions with similar behavior to that of Samples 4 and 5 except that much less free fluid was retained (>80% less fluid). This amount of free fluid could be reduced by increasing the amount of cement kiln dust in the mixture by two-fold as illustrated by Sample 8. Samples 7 and 8 both completely solidified into a hardened mass in less than 30 minutes. For the control (Sample 9), a 1:2 mixture of aqueous sodium aluminate and aqueous sodium silicate formed a non-flowable gel upon mixing, with no free fluid, and did not sent into a hardened mass.

Samples 10 and 11: Increasing the amount of cement kiln dust such that the ratio of aqueous sodium aluminate, cement kin dust and aqueous sodium silicate was 2:1:2 (Sample 10) again resulted in immediate gelation with a reasonable amount of free fluid. This material set into a hardened mass in less than 20 minutes and a compressive strength of greater than 130 psi was measured after 24 hours (190° F., cylinder crush). Compressive strength was determined in accordance with API RP 10B-2, Recommended Practice for Testing Well Cements, First Edition, July 2005. As illustrated by Sample 11, a mixture with a 1:1:2 ratio of aqueous sodium aluminate, cement kin dust and aqueous sodium silicate also produced a non-flowable gel upon mixing, but did not retain any free fluid. It did, however, completely solidify in less than 30 minutes, but had less compressive strength (crumbly solid) than Sample 10. In a further example, the design of Sample 10 was prepared and upon mixing the components, the free fluid was poured into a separate container. This free fluid remained in a flowable, liquid state for at least 30 minutes before setting into a solid mass, thus illustrated that it is an active free fluid.

Samples 12 and 13: In order to determine whether the observations could occur with the combination of only two active components or required all three active components, comparative Samples 12 and 13 were prepared. It was shown that either a mixture of aqueous sodium aluminate and cement kiln dust (Sample 12) or a mixture of aqueous sodium silicate and cement kiln dust (Sample 13), both in a 10:1 ratio, formed a viscous slurry but did not form a non-flowable gel nor set into a hardened mass for at least 48 hours.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the example embodiments are well adapted to attain the ends and advantages mentioned as well as those that are inherent therein. The particular embodiments disclosed above are illustrative only, as the disclosed embodiments may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
   introducing a settable composition comprising cement kiln dust, an alkali aluminate, an alkali silicate, and an aqueous carrier fluid into a subterranean formation,
   wherein at least one of the alkali aluminate or the alkali silicate are encapsulated to retard gelation;
   releasing at least one of the encapsulated alkali aluminate and the encapsulated alkali silicate and contacting the cement kiln dust, the alkali aluminate, and the alkali silicate in the subterranean formation proximate to or within a lost circulation zone; and
   allowing the settable composition to set and thereby reduce fluid flow through a portion of the subterranean formation, wherein a portion of the settable composition sets to form a non-flowable gel while a minor portion of the settable composition remains an active free fluid in a flowable liquid state, the active free fluid penetrating further into the portion of the subterranean formation,
   wherein the introducing the settable composition comprises introducing the settable composition into the subterranean formation as a single stream.

2. The method of claim 1, wherein the cement kiln dust is present in the settable composition in an amount of about 1% to about 25% by weight of the settable composition, wherein the alkali aluminate is present in the settable composition in an amount of about 1% to about 40% by weight of the settable composition, and wherein the alkali silicate is present in the settable composition in an amount of about 1% to about 40% by weight of the settable composition.

3. The method of claim 1, wherein the cement kiln dust is present in the settable composition in an amount of about 5% to about 25% by weight of the settable composition, wherein the alkali aluminate is present in the settable composition in an amount of about 5% to about 30% by weight of the settable composition, and wherein the alkali silicate is present in the settable composition in an amount of about 5% to about 30% by weight of the settable composition.

4. The method of claim 1, wherein the alkali aluminate comprises sodium aluminate, and wherein the alkali silicate comprises sodium silicate.

5. The method of claim 1, wherein a ratio of alkali aluminate to cement kiln dust to alkali silicate in the settable composition is about 2:1:2.

* * * * *